April 21, 1953 H. J. McC. BURDICK Re. 23,646

PROJECTABLE NOZZLE LAWN SPRINKLER

Original Filed July 25, 1949 2 SHEETS—SHEET 1

INVENTOR:
HARRY J. McCOMBS BURDICK
BY
O'Marcia
ATTORNEY

PROJECTABLE NOZZLE LAWN SPRINKLER

Original Filed July 25, 1949 2 SHEETS--SHEET 2

INVENTOR:
HARRY J. McCOMBS BURDICK
BY
O. O. Martin
ATTORNEY

Reissued Apr. 21, 1953

Re. 23,646

UNITED STATES PATENT OFFICE 23,646

PROJECTABLE NOZZLE LAWN SPRINKLER

Harry J. McCombs Burdick, Anaheim, Calif.

Original No. 2,611,644, dated September 23, 1952, Serial No. 106,688, July 25, 1949. Application for reissue December 1, 1952, Serial No. 323,526

20 Claims. (Cl. 299—61)

Matter enclosed in heavy brackets [ ] appears in the original patent but forms no part of this reissue specification; matter printed in italics indicates the additions made by reissue.

This invention relates to lawn sprinklers of the type in which the sprinkler nozzles not only are caused to rotate by the pressure of the stream of water discharging therefrom, but in which the nozzles are by the pressure of the flowing water advanced to a position at or above the surrounding ground level, while the major portion of the device remains below the ground level. In such devices one of the most difficult problems is so to design a sprinkler head that little soil or other foreign matter will enter the device during and between operations thereof, *as when moving the mechanism from the casing.*

With a view to solve this serious problem, it is the general object of my invention to provide a sprinkler head of the type referred to in which the nozzles and all the mechanisms connected therewith is seated within, and removable from a casing which remains permanently fixed in the ground to form a guard resisting entrance of soil and grit into the sprinkler mechanism.

A further object of the invention is to provide a device including such casing from which the sprinkler mechanism may be quickly and easily removed as a single unit or in complementary sub-units without disturbing the position of the casing. Another object is to provide a sprinkler mechanism in which every part is readily accessible for cleaning or replacement.

It is a further object of the invention to provide a sprinkler mechanism in which is provided means for preventing back flow of water the moment the water supply is turned off. Another object is to provide means whereby flow of water through any particular sprinkler head of an irrigating system may be adjusted to equalize the flow of water through all the nozzles of the system or entirely cut off. This is of particular importance where the ground to be irrigated is uneven or sloping and the sprinkler heads for this reason are set at different elevations. Another object is to provide a sprinkler in which the heads will recede into the casing the moment the water is turned off even in cases where the sprinkler heads are tilted to conform to the angle of inclination of the ground surface. A still further object is to provide a sprinkler head which is designed and constructed to prevent breakage of parts thereof in case the movement of the nozzles should be checked due to seizing or sticking of supporting parts thereof.

With these and other objects in view the invention resides in combinations hereinafter described in detail and reference is invited to the accompanying drawings in which a preferred form of the invention is illustrated.

Figure 4:
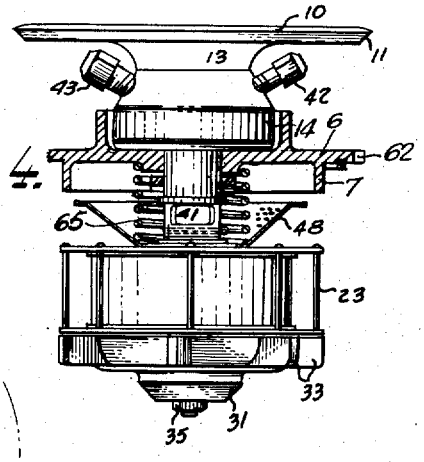
Fig. 4 shows the inner mechanism of the device as it appears when removed from the outer casing thereof.
Figure 1:
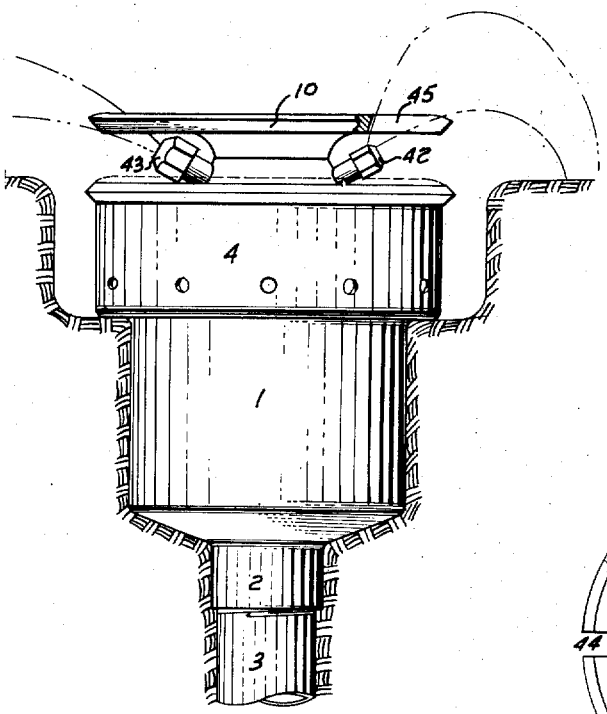
Fig. 1 is a side elevational view of the device of my invention as it appears when seated in the ground, as in practice.
Figure 5:
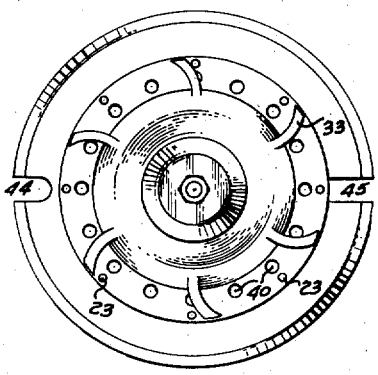
Fig. 5 is a bottom view of the mechanism shown in Fig. 4.
Figure 3:
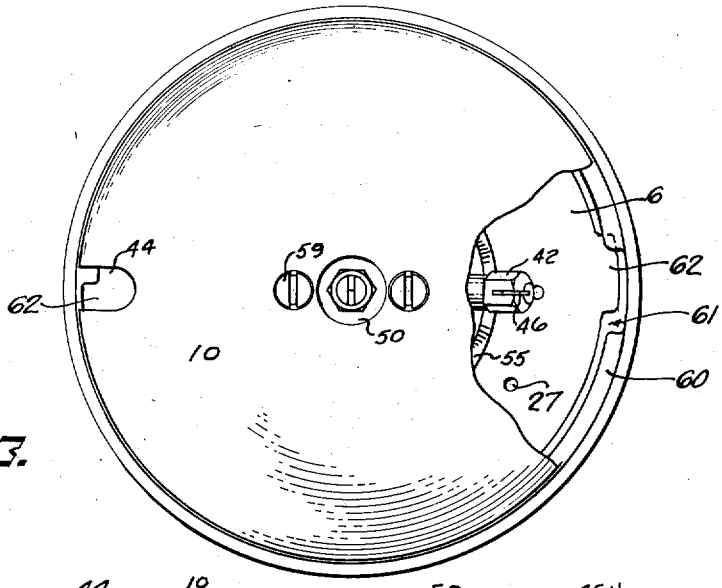
Fig. 3 is a substantially corresponding plan view of the device with a portion of the cover thereof broken away for the sake of clearness.
Figure 2:
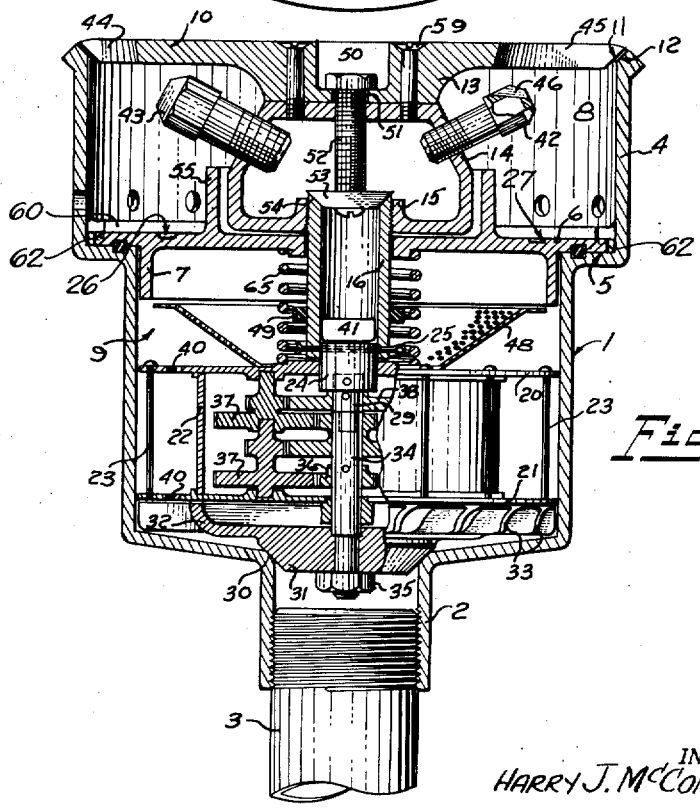
Fig. 2 is a cross-sectional view of the device itself, on a larger scale and with some of the inner portions thereof only partly in section in order more clearly to illustrate important features thereof.

The device of my invention, in the form illustrated in the drawings, includes a cylindrical casing 1 terminating at the bottom of an internally threaded shoulder portion 2, by means of which the casing may be mounted in position on a pipe 3 forming part of an irrigation pipe system. The upper portion 4 of the casing is somewhat larger in diameter than the central part thereof, in order to provide within the casing an annular surface 5 of a size to receive thereon a circular partition 6 which is designed to form a water-tight closure between the space 8 above and the chamber 9 below the plate. The manner in which this plate is clamped in position will be hereinafter fully described. At the present moment, it should be sufficient to point out that the partition includes a downwardly directed sleeve 7 which forms a guide for correctly seating this part. The casing is proportioned as above described, in order to receive therein the rotatable and axially movable nozzle head assembly of the invention. This assembly is, as best indicated in Fig. 3, fitted at the top with a circular plate 10, the outer rim 11 of which is shown downwardly and inwardly tapered to ride on a beveled seat 12 within the top rim of the upper casing portion 4. The central part of this plate is shown downwardly extended to form a pendent boss 13, to the bottom surface of which is rigidly secured a hollow, cylindrical nozzle support member 14. As best shown in Fig. 2, this member has, in the bottom wall thereof, a central threaded perforation 15, of a size to receive therein a tubular member 16 which, for convenience of description, hereinafter sometimes is referred to as the riser of the nozzle head assembly.

Co-axial with and snugly fitted for rotatory as well as axial movement within the central chamber 9 of the casing is a cylindrical container comprising top and bottom plates 20, 21 between which a somewhat smaller cylindrical sleeve 22 is rigidly and tightly clamped in position, as by means of a series of bolts 23. From the top plate 20 of this container projects axially a boss 24 to fit tightly within the bottom opening of the riser 16, and this boss is rigidly locked in position within the riser as by a cotter key 25.

A conical valve seat 30 is formed in the bottom wall of the chamber 9 of a size to receive thereon a conical valve member 31 which forms part of a shallow, cup-shaped member 32. Vanes 33 project radially from the outer surface of this member and they are laterally inclined or curved to form with the member the rotor assembly of the device. Axially rising through the rotor assembly is a stub shaft 34 and this shaft is rigidly maintained clamped in position within the member by means of a nut 35 engaging the threaded end of the shaft. In the upper end of the shaft is a coaxial shaft 29 seated to rotate and it is secured within the boss 24. A gear pinion 36 is rigidly secured to the shaft 34 and it is, through a conventional train of planetary speed reducing gears 37, operatively connected with a gear 38 of the shaft 29, near the top thereof, to rotate the boss 24, the riser 16 and the nozzle head assembly at extremely slow speed.

From the foregoing brief description, it should be clear to anyone familiar with the art that the entire sprinkler head assembly is free to rotate and to rise axially within the casing. It follows that, when the water is turned on in the irrigation pipe system, pressure of the water will force the assembly upward, thereby to unseat the valve 31 and to allow the water to flow past the vanes 33 of the rotor which, by the pressure of the onrushing water is caused to rotate and quickly to attain high speed of rotation. The rising water passes through a series of passages 40, through the overhanging peripheral flanges of the top and bottom plates 20, 21, from whence it flows through openings 41 in the wall of the riser 16, to flow through the latter into the nozzle support member 14; finally to discharge through nozzles 42, 43. The water pressure continues to elevate the sprinkler head until a part of the transmission assembly, or the screen 48, moves into contact with a portion of the partition 6, by friction to maintain the cylindrical gear container unturned during sprinkling operations. Should, however, in the course of time enough foreign matter find its way into the casing to settle below the nozzle support 14 and in the bearing between the partition 6 and the member 16 to retard or stop rotation of the nozzle assembly, then the pressure exerted by the impeller member through the reduction gears against the gear container will cause the container to rotate. The pressure, which otherwise might be sufficient to shear the cotter key 25 or otherwise to damage the mechanism, is thereby relieved.

It is noticed that the upper end of the riser 16 is closed by a valve 52 which must be raised from its seat in order to provide free passage for the water to the nozzles in the manner which will be hereinafter described in detail.

Notches 44, 45 are sunk into the periphery of the top plate 10 and they are, in accordance with present day sprinkler practice, proportioned evenly to distribute the spray over the space to be irrigated. To illustrate this important point, the notch 44 is relatively shallow and is placed in axial alignment with the passage through the nozzle 43. The notch 45 is cut much deeper and a slot 46 is cut into the upper corner of the nozzle 42 to provide an upwardly directed outlet for water discharging through the nozzle. The result being that some of the discharging water rises through the inner portion of the notch 45 on a shorter curve to irrigate the area nearer the sprinkler head, whereas the water discharging axially through the nozzle 43 passes on a longer, flatter curve to the outer portions of the area.

It is believed that the foregoing description of the operation of the device should be sufficient to enable one conversant with the art to design and construct the device of the invention. In addition, it should be mentioned that, according to present day engineering practice, means should be embodied for screening out all grit and other foreign substances from the water before it flows into the nozzles. Illustrative of such means, I have shown a conically shaped screen 48 rising from the top plate 20 of the rotor to the pendent sleeve 7 of the plate 6. It may also be found advantageous to place a sealing ring 49 on the riser 16 to contact the under surface of this plate, when the nozzle head assembly reaches its uppermost position during irrigation operations, so to form a water seal between the chamber 9 and the space within the nozzle support 14.

Experience has taught me that, in cases where sprinkler heads are placed at different elevations, as required to irrigate uneven or sloping ground, once the supply has been turned off, the water remaining in the higher portions of the system will flow back through the sprinkler heads at the lower portion of the system to form pools or to cause soil erosion about these lower sprinkler heads. Also that a considerable amount of more or less gritty soil becomes stirred up in these pools, gradually to settle within the sprinkler heads, often to cause considerable damage therein.

This condition is often so serious that it becomes necessary to remove the entire sprinkler head for cleaning after each irrigation. In order to prevent such occurrences and so as to eliminate frequently recurring cleaning operations, I have provided the valve 31 which will become seated the moment the water supply is cut off and the sprinkler head assembly instantly by gravity commences to settle. Backflow to all sprinkler heads at lower levels is thereby prevented. In addition, I have provided manually operable means for checking backflow through the sprinkler head of my invention. To this end, a recess 50 is sunk into the top plate 10 of the assembly and a passage 51 leads from this recess through the bottom of the plate and the upper wall of the member 14 in axial alignment with the riser 16. A bolt 52 is seated in threads of this passage and it is fitted at the bottom thereof with a conical valve 53. A valve seat 54 is sunk into the top of the riser 16 of a size to receive this valve, thereby to check backflow into the chamber 9. This valve, which in Fig. 2 is shown closed, is in order to prepare the device for the sprinkling operation first manually elevated sufficiently not only to provide clearance for the rising movement of the assembly but also to remain a sufficient distance above the fully elevated assembly to insure free passage for the stream of water flowing through the assembly. But when the valve is manually closed, as indicated in Fig. 2, it will effectively prevent backflow through even the uppermost sprinkler head. In addition, it may be found advantageous to mount an annular flange 55 on and as part of the plate 6 in close proximity to the outer periphery of the nozzle support 14. With this flange in place, a considerable amount of grit may gradually over a long period of time accumulated within the space surrounding the flange before it becomes necessary to remove the assembly from the casing for cleaning.

In the types of projectable nozzle sprinkler heads which have come to my notice, no single nozzle assembly is provided, but each part or sub-assembly of the mechanism must be removed separately in order effectively to perform the cleaning operation. The nozzle head assembly of the present device eliminates such laborious operations. When it is found necessary or advisable to clean out the upper chamber 8, it is merely required to remove the screws 59 which clamp the top plate 10 in position on the nozzle support and then to remove this plate.

The partition 6 is designed for quick and convenient withdrawal to permit removal of the assembly as a whole. To this end an annular rib 60 is made to project inwardly from the casing wall a short distance above the partition support surface 5 and a series of equidistantly spaced notches 61 are cut through this rib. The partition 6 is made with similarly spaced radially directed projections 62 of a size to pass through these notches and by a slight rotation of the partition to slide under the rib 60. In practice, a suitable spanner wrench is pushed through the top plate notches 44, 45 and caused to enter the two diametrically opposite recesses 26, 27 of the partition 6 which appear through these notches. If none appear, it is merely required slightly to turn the top plate 10 and proper alignment is obtained. The wrench is then operated to move the projections 62 into registration with the notches 61. The entire assembly may then be lifted out of the casing leaving the latter entirely open for cleaning.

It was above stated that the cotter key 25 ties the gear casing to the riser 16. Upon withdrawal of this key, the entire lower portion of the assembly may be withdrawn from the upper part thereof for removal and cleaning of the screen 48 and such further servicing as may be required. And it is important to note that, during such removal operations and until reseating is effected, the casing remains undisturbed in the ground to bar entrance therein of dirt and grit.

From the foregoing detailed description, it is seen that I have provided a very compact and conveniently operable sprinkler head. Particularly, it is to be noted that the device, as illustrated in the drawings, is considerably lower than any other of the same type that has come to my notice. When it is considered that the depth to which it is required to dig to install the sprinkler system depends upon the height of the sprinkler head, this becomes an important feature of the invention.

While under ordinary conditions, where the sprinkler head is vertically mounted, it is found that the nozzle head assembly will instantly return to bottom valve closing position when the water supply is turned off; it becomes necessary at times so to plan the system that the heads are tilted or even partially inverted. In such cases, it may be found advisable to place a light compression spring 65 about the tubular riser 16 to insure complete seating of the valve 31 while the system remains dormant.

While I have in the foregoing described a preferred form of the invention, it will be understood that I reserve the right to embody therein modifications with the scope of the claims hereto appended.

I claim:

1. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial nozzle support rotatable on said rotor but locked in position thereon against relative axial movement, and transmission gearing extending from the rotor to the nozzle support, water pressure causing the inlet valve to rise from its seat simultaneously to elevate the sprinkler head within the casing and to impart rotation to said rotor thereby through said gearing to rotate the nozzle support at a reduced rate of speed.

2. In a lawn sprinkler, a cylindrical casing open at the top and having at the bottom a coaxial water inlet shaped to form a valve seat, a sprinkler head seated in the casing for axial movement therein and removable therefrom as a whole, manually releasable means for locking the sprinkler head against removal from the casing, said sprinkler head comprising, a rotor having a valve at the bottom thereof normally in contact with the valve seat of the water inlet, a coaxial nozzle support rotatable on said rotor but locked in position thereon against relative axial movement, and transmission gearing extending from the rotor to the nozzle support, water pressure causing the inlet valve to rise from its seat simultaneously to elevate the sprinkler head within the casing and to impart rotation to said rotor thereby through said gearing to rotate the nozzle support at a reduced rate of speed.

3. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial nozzle support rotatable on said rotor but locked in position thereon against relative axial movement, transmission gearing extending from the rotor to the nozzle support, and resilient means urging downward movement of the sprinkler head to seat the valve, water pressure causing the inlet valve to rise from its seat against the tension of said resilient means simultaneously to elevate the sprinkler head within the casing and to impart rotation to said rotor thereby through said gearing to rotate the nozzle support at a reduced rate of speed.

4. In a lawn sprinkler, a cylindrical casing open at the top and having at the bottom a coaxial water inlet shaped to form a valve seat, a sprinkler head seated in the casing for axial movement therein and removable therefrom as a whole, manually releasable means for locking the sprinkler head against removal from the casing, said sprinkler head comprising, a rotor having a valve at the bottom thereof normally in contact with the valve seat of the water inlet, a coaxial nozzle support rotatable on said rotor but locked in position thereon against relative axial movement, transmission gearing extending from the rotor to the nozzle support, water pressure causing the inlet valve to rise from its seat simultaneously to elevate the sprinkler head within the casing and to impart rotation to said rotor thereby through said gearing to rotate the nozzle support at a reduced rate of speed, and means tightly enclosing said gearing, said means being normally free to rotate within the casing and held against rotation therein by frictional engagement with said locking means when the sprinkler head is fully elevated.

5. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial nozzle support rotatable on said rotor but locked in position thereon against relative axial movement, upwardly and outwardly directed nozzles seated in said support, a circular plate on the support normally closing the top of the casing, said plate having notches in the periphery thereof in alinement with the nozzle axes, and transmission gearing extending from the rotor to the nozzle support, water pressure causing the inlet valve to rise from its seat simultaneously to elevate the sprinkler head within the casing and to impart rotation to said rotor thereby through said gearing to rotate the nozzle support at a reduced rate of speed.

6. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial nozzle support rotatable on said rotor but locked in position thereon against relative axial movement, transmission gearing extending from the rotor to the nozzle support, water pressure causing the inlet valve to rise from its seat simultaneously to elevate the sprinkler head within the casing and to impart rotation to said rotor thereby through said gearing to rotate the nozzle support at a reduced rate of speed, a valve seat in the nozzle support, and a valve for said seat, said valve being manually operable from above the nozzle support to adjust and entirely to shut off the flow through the sprinkler head.

7. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial nozzle support rotatable on said rotor but locked in position thereon against relative axial movement, upwardly and outwardly directed nozzles seated in said support, a circular plate on the support normally closing the top of the casing, said plate having notches in the periphery thereof in alinement with the nozzle axes, transmission gearing extending from the rotor to the nozzle support, water pressure causing the inlet valve to rise from its seat simultaneously to elevate the sprinkler head within the casing and to impart rotation to said rotor thereby through said gearing to rotate the nozzle support at a reduced rate of speed, a valve seat in said nozzle support, and a valve for engagement with said seat, the valve having a threaded stem rising therefrom seated in a threaded aperture of *the* support for manual movement to move the valve to adjust and entirely to shut off the flow through the sprinkler head.

8. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial stem rising from the rotor, a shaft in continued axial alinement with said stem, a gear rigid on the stem, a gear rigidly secured to the shaft, a train of reducing gears operatively interconnecting the two gears a coaxial nozzle support riding on said shaft, and means for interlocking said support with the said shaft, water pressure causing the inlet valve to rise from its seat simultaneously to elevate the sprinkler head within the casing and to impart rotation to the rotor thereby through said gearing to rotate the nozzle support at reduced speed.

9. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial stem rising from the rotor, a shaft in continued axial alinement with said stem, a gear rigid on the stem, a gear rigidly secured to the shaft, a train of reducing gears operatively interconnecting the two gears, a coaxial nozzle support riding on said shaft, a closure for said gears riding on said stem and shaft, and means for interlocking said support with the said shaft, water pressure causing the inlet valve to rise from its seat simultaneously to elevate the sprinkler head within the casing and to impart rotation to the rotor thereby through said gearing to rotate the nozzle support at reduced speed.

10. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial stem rising from the rotor, a shaft in continued axial alinement with said stem, a gear rigid on the stem, a gear rigidly secured to the shaft, a train of reducing gears operatively interconnecting the two gears, *a closure for said gears riding on said stem and shaft,* a coaxial nozzle support riding on said shaft, means for interlocking said support with the said shaft, water pressure causing the inlet valve to rise from its seat simultaneously to elevate the sprinkler head within the casing and to impart rotation to the rotor thereby through said gearing to rotate the nozzle support at reduced speed, and a screen between said closure and the said nozzle support.

11. In a lawn sprinkler, a cylindrical casing open at the top and having at the bottom a coaxial water inlet shaped to form a valve seat, a sprinkler head seated in the casing for axial movement therein and removable therefrom as a whole, said sprinkler head comprising, a rotor having a valve at the bottom thereof normally in contact with the valve seat of the water inlet, a coaxial stem rising from the rotor, a shaft in continued axial alinement with said stem, a gear rigid on the stem, a gear rigidly secured to the shaft, a train of reducing gears operatively interconnecting the two gears, a coaxial nozzle support riding on said shaft, *a closure for said gears riding on said stem and shaft,* means for interlocking said support with the said shaft, water pressure causing the inlet valve to rise from its seat simultaneously to elevate the sprinkler head within the casing and to impart rotation to the rotor thereby through said gearing to rotate the nozzle support at reduced speed, a screen between said closure and said nozzle support, and resilient means urging the sprinkler head downward to seat the inlet valve on its seat.

*12. In a lawn sprinkler, a cylindrical casing open at the top and having at the bottom a coaxial water inlet, a sprinkler head seated in the casing for axial movement therein and removable therefrom as a whole, manually releasable means for locking the sprinkler head against removal from the casing, said sprinkler head comprising, a rotor, a coaxial nozzle support rotatable on said rotor but locked in position thereon against relative axial movement, and transmission gearing extending from the rotor to the nozzle support, water pressure causing the sprinkler head to rise within the casing and to impart rotation to said rotor thereby through said gearing to rotate the nozzle support at a reduced rate of speed.*

*13. In a lawn sprinkler, a cylindrical casing open at the top and having at the bottom a coaxial water inlet, a sprinkler head seated in the casing for axial movement therein and removable therefrom as a whole, said sprinkler head comprising, a rotor, a coaxial nozzle support rotatable on said rotor but locked in position thereon against relative axial movement, transmission gearing extending from the rotor to the nozzle support, and resilient means urging downward movement of the sprinkler head to seat the valve, water pressure causing the rotor to rise against the tension of said resilient means simultaneously to elevate the sprinkler head within the casing and to impart rotation to said rotor thereby through said gearing to rotate the nozzle support at a reduced rate of speed.*

*14. In a lawn sprinkler, a cylindrical casing open at the top and having at the bottom a coaxial water inlet, a sprinkler head seated in the casing for axial movement therein and removable therefrom as a whole, manually releasable means for locking the sprinkler head against removal from the casing, said sprinkler head comprising, a rotor, a coaxial nozzle support rotatable on said rotor but locked in position thereon against relative axial movement, transmission gearing extending from the rotor to the nozzle support, water pressure causing the rotor to rise simultaneously to elevate the sprinkler head within the casing and to impart rotation to said rotor thereby through said gearing to rotate the nozzle support at a reduced rate of speed, and means tightly enclosing said gearing, said means being normally free to rotate within the casing and held against rotation therein by frictional*

*engagement with said locking means when the sprinkler head is fully elevated.*

*15. In a lawn sprinkler, a cylindrical casing open at the top and having at the bottom a coaxial water inlet, a sprinkler head seated in the casing for axial movement therein and removable therefrom as a whole, said sprinkler head comprising, a rotor, a coaxial nozzle support rotatable on said rotor but locked in position thereon against relative axial movement, upwardly and outwardly directed nozzles seated in said support, a circular plate on the support normally closing the top of the casing, said plate having notches in the periphery thereof in alinement with the nozzle axes, and transmission gearing extending from the rotor to the nozzle support, water pressure causing the rotor to rise simultaneously to elevate the sprinkler head within the casing and to impart rotation to said rotor thereby through said gearing to rotate the nozzle support at a reduced rate of speed.*

*16. In a lawn sprinkler, a cylindrical casing open at the top and having at the bottom a coaxial water inlet, a sprinkler head seated in the casing for axial movement therein and removable therefrom as a whole, said sprinkler head comprising, a rotor, a coaxial nozzle support rotatable on said rotor but locked in position thereon against relative axial movement, transmission gearing extending from the rotor to the nozzle support, water pressure causing the rotor to rise simultaneously to elevate the sprinkler head within the casing and to impart rotation to said rotor thereby through said gearing to rotate the nozzle support at a reduced rate of speed, a valve seat in the nozzle support, and a valve for said seat, said valve being manually operable from above the nozzle support to adjust and entirely to shut off the flow through the sprinkler head.*

*17. In a lawn sprinkler, a cylindrical casing open at the top and having at the bottom a coaxial water inlet, a sprinkler head seated in the casing for axial movement therein and removable therefrom as a whole, said sprinkler head comprising, a rotor, a coaxial nozzle support rotatable on said rotor but locked in position thereon against relative axial movement, upwardly and outwardly directed nozzles seated in said support, a circular plate on the support normally closing the top of the casing, said plate having notches in the periphery thereof in alinement with the nozzle axes, transmission gearing extending from the rotor to the nozzle support, water pressure causing the rotor to rise simultaneously to elevate the sprinkler head within the casing and to impart rotation to said rotor thereby through said gearing to rotate the nozzle support at a reduced rate of speed, a valve seat in said nozzle support, and a valve for engagement with said seat, the valve having a threaded stem rising therefrom seated in a threaded aperture of support for manual movement to move the valve to adjust and entirely to shut off the flow through the sprinkler head.*

*18. In a lawn sprinkler, a cylindrical casing open at the top and having at the bottom a coaxial water inlet, a sprinkler head seated in the casing for axial movement therein and removable therefrom as a whole, said sprinkler head comprising, a rotor, a coaxial stem rising from the rotor, a shaft in continued axial alinement with said stem, a gear rigid on the stem, a gear rigidly secured to the shaft, a train of reducing gears operatively interconnecting the two gears,*

*a coaxial nozzle support riding on said shaft, and means for interlocking said support with the said shaft, water pressure causing the rotor to rise simultaneously to elevate the sprinkler head within the casing and to impart rotation to the rotor thereby through said gearing to rotate the nozzle support at reduced speed.*

*19. In a lawn sprinkler, a cylindrical casing open at the top and having at the bottom a coaxial water inlet, a sprinkler head seated in the casing for axial movement therein and removable therefrom as a whole, said sprinkler head comprising, a rotor, a coaxial stem rising from the rotor, a shaft in continued axial alinement with said stem, a gear rigid on the stem, a gear rigidly secured to the shaft, a train of reducing gears operatively interconnecting the two gears, a coaxial nozzle support riding on said shaft, a closure for said gears riding on said stem and shaft, and means for interlocking said support with the said shaft, water pressure causing the rotor to rise simultaneously to elevate the sprinkler head within the casing and to impart rotation to the rotor thereby through said gearing to rotate the nozzle support at reduced speed.*

*20. In a lawn sprinkler, a cylindrical casing open at the top and having at the bottom a coaxial water inlet, a sprinkler head seated in the*

*casing for axial movement therein and removable therefrom as a whole, said sprinkler head comprising, a rotor, a coaxial stem rising from the rotor, a shaft in continued axial alinement with said stem, a gear rigid on the stem, a gear rigidly secured to the shaft, a train of reducing gears operatively interconnecting the two gears, a coaxial nozzle support riding on said shaft, a closure for said gears riding on said stem and shaft, means for interlocking said support with the said shaft, water pressure causing the rotor to rise simultaneously to elevate the sprinkler head within the casing and to impart rotation to the rotor thereby through said gearing to rotate the nozzle support at reduced speed, and a screen between said closure and the said nozzle support.*

HARRY J. McCOMBS BURDICK.

References Cited in the file of this patent or the original patent

UNITED STATES PATENTS

| Number | Name | Date |
|---|---|---|
| 1,425,191 | Garbarini | Aug. 8, 1922 |
| 1,753,841 | Thompson | Apr. 8, 1930 |
| 1,853,805 | Elder | Apr. 12, 1932 |
| 1,970,126 | Buckner | Aug. 14, 1934 |